UNITED STATES PATENT OFFICE.

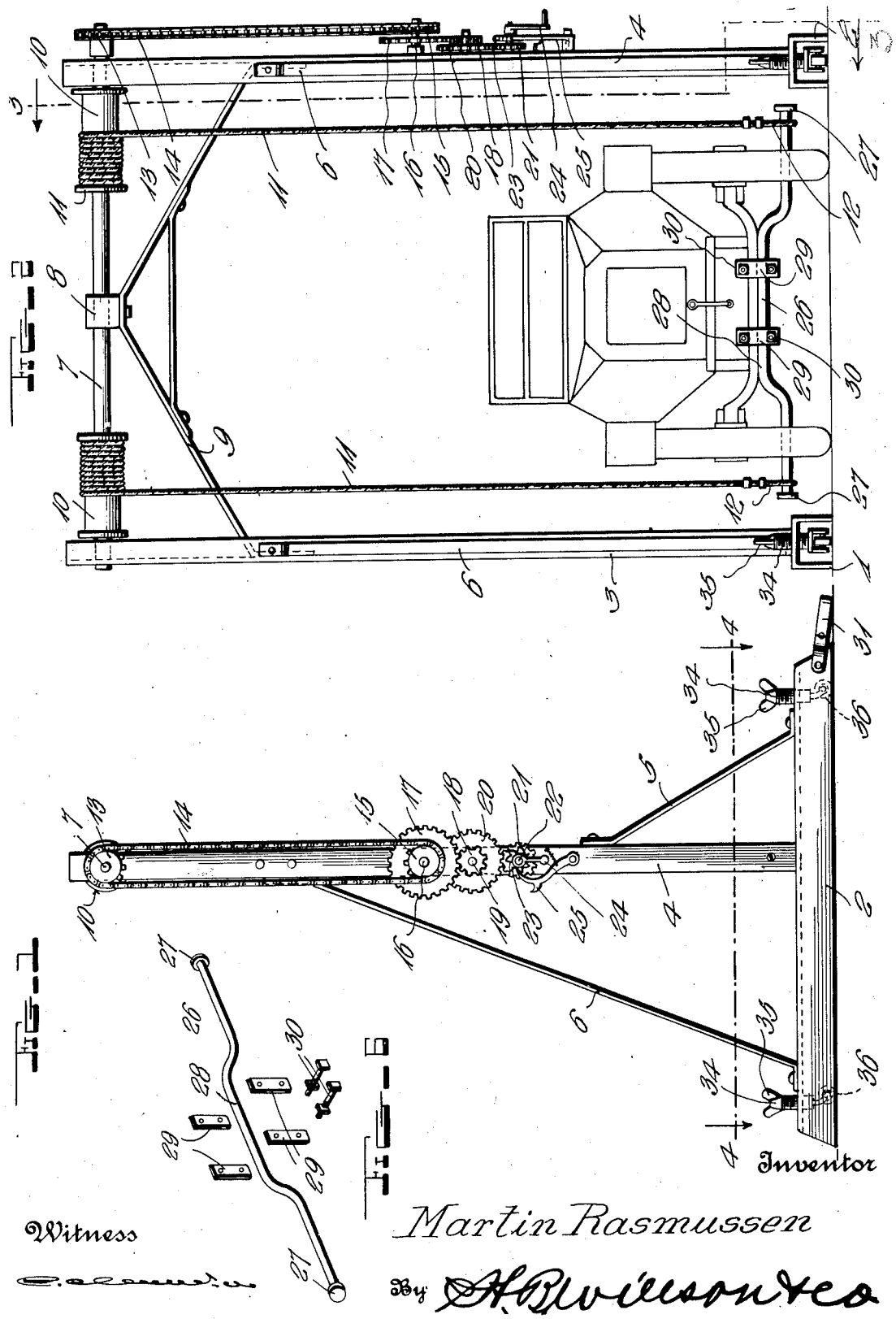

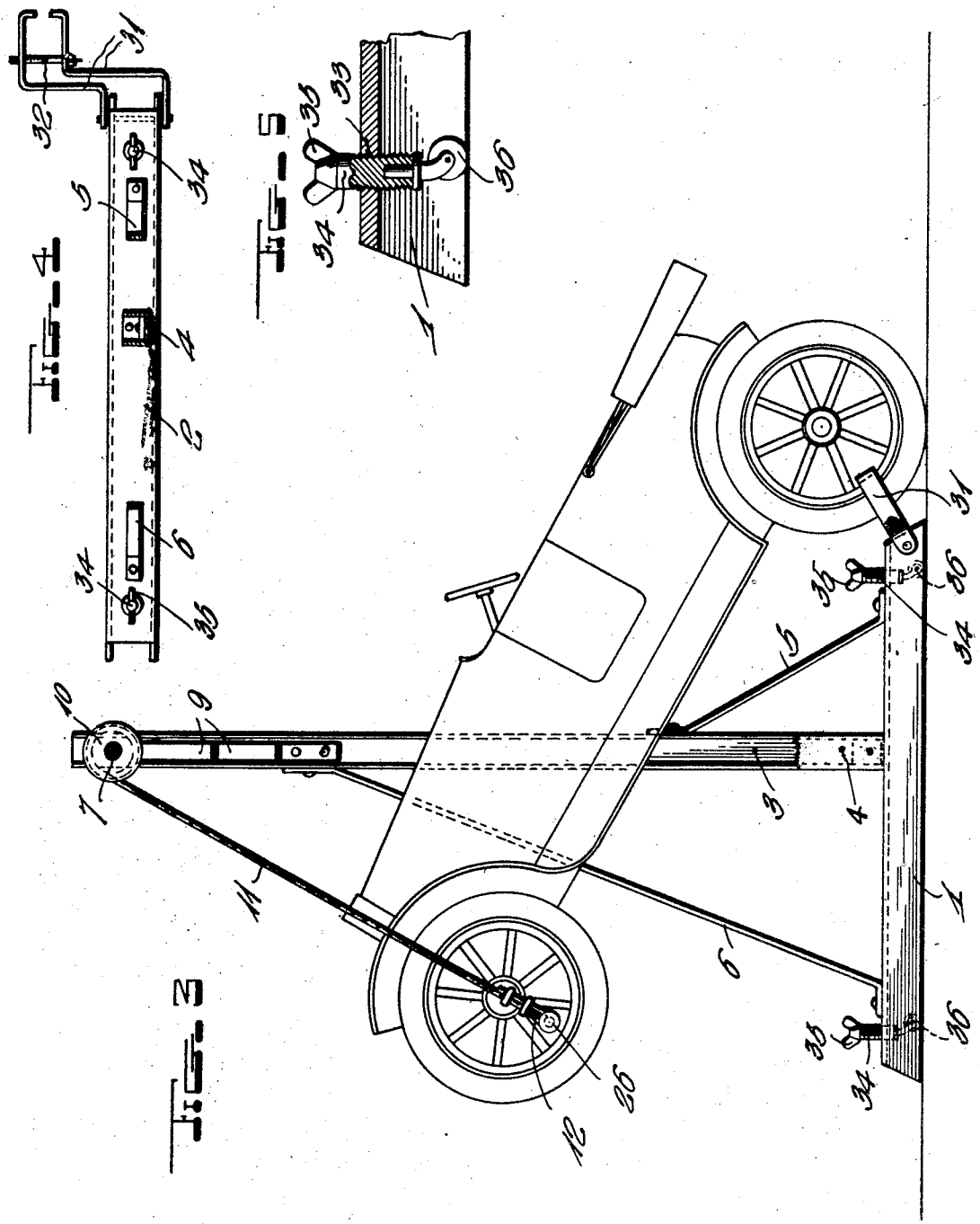

MARTIN RASMUSSEN, OF RACINE, WISCONSIN.

AUTOMOBILE-HOIST.

1,355,690.  Specification of Letters Patent.  Patented Oct. 12, 1920.

Application filed October 20, 1919. Serial No. 331,779.

*To all whom it may concern:*

Be it known that I, MARTIN RASMUSSEN, a citizen of the United States, residing at Racine, in the county of Racine and State of Wisconsin, have invented certain new and useful Improvements in Automobile-Hoists; and I do declare the following to be a full, clear, and exact description of the invention, such as will enable others skilled in the art to which it appertains to make and use the same.

This invention relates generally to hoisting devices, but more particularly to motor vehicle or automobile hoists.

The principal object of the invention is to provide a hoist by which one end of an automobile may be raised so that the parts on the under side of the automobile are easily accessible for repairing.

Another object of the invention is to provide a hoist of this character in which the means for attachment to the hoist is of unique construction.

An additional object of the invention is to provide an automobile hoist especially adapted for garages where automobiles are cleaned and repaired as it is provided with casters so that it may be transported from one place in the garage to another.

A still further object of the invention is to provide a device of this class which will be comparatively simple, strong, durable and inexpensive in construction, one which will be efficient and reliable in operation, and well adapted to the purpose for which it is designed.

With these and other objects in view, the invention consists of certain novel features of construction, and the combination and arrangement of parts as will be hereinafter fully described and claimed.

In the accompanying drawings forming a part of the specification and in which similar reference characters designate like parts throughout the several views, Figure 1 is a side elevation of an automobile hoist constructed in accordance with this invention;

Fig. 2 is a front view of the hoist;

Fig. 3 is a sectional view taken on the plane indicated by the line 3—3 of Fig. 2, showing an automobile with one end raised;

Fig. 4 is a horizontal sectional view taken on the plane indicated by the line 4—4 of Fig. 1;

Fig. 5 is a vertical sectional view through one of the side sills of the hoist, showing particularly one of the casters; and, Fig. 6 is a perspective view of the yoke and parts associated therewith for attachment to one end of the automobile.

The preferred form of the invention comprises a pair of side sills 1 and 2 which are preferably in the form of inverted channels. Connected at their lower ends in any suitable manner to the upper sides of the sills 1 and 2 are upright posts or standards 3 and 4 respectively. The posts 3 and 4 are also constructed of channels. The posts 3 and 4 are braced by short diagonal braces 5 and long diagonal braces 6, the braces 5 being disposed on one side of the post while the braces 6 are disposed on the other side of the same. The upper ends of the braces 5 and 6 are secured to the posts 3 and 4 while the lower ends of the braces are secured to the side sills 1 and 2. Extending between the posts 3 and 4 and journaled in the upper ends of the same is a shaft 7, the latter being also journaled in a bearing 8 carried by a truss 9 having its ends secured to the posts 3 and 4.

Fixedly secured upon the shaft 7 adjacent the posts 3 and 4 are winding drums 10 having wound thereon flexible cables 11, the free ends of which are provided with loops 12. The shaft 7 has one end extending through the post 4 to the outer side of the same and is provided with a sprocket 13 over which passes a sprocket chain 14. The sprocket chain 14 also passes around a sprocket 15 carried upon a shaft 16 mounted upon the post 4 and which also carries a gear 17. The gear 17 meshes with a pinion 18 carried by a shaft 19 which is mounted to the post 4 and which carries a gear 20. The gear 20 is engaged by a pinion 21 mounted upon a shaft 22, upon which is also mounted a ratchet 23 and an operating crank 24. The ratchet 23 is engaged by a spring pressed pawl or dog 25. By operating the crank 24 rotary movement will be imparted to the shaft 7 and the winding drums 10 carried thereby so as to wind the cables 11 upon the latter.

The numeral 26 designates a yoke or bar having heads 27 arranged on its ends and having its intermediate portion 28 offset. This bar is adapted to be passed through the wheels of an automobile between the spokes so that the intermediate portion 28 will be disposed adjacent the axle. The intermediate portion 28 is then clamped to the axle by means of pairs of straps 29 and bolts 30. After this has been done the loops 12 carried at the lower ends of the cables 11 are passed over the heads 27 and thus connect them to the bar. One of the wheels at the other end of the automobile is clamped by the two part clamp made from a pair of straps 31 having one of their ends pivoted to one end of the side sill 2 and their other ends offset and provided with a clamping bolt 32. The free ends of the straps 31 are to be disposed around the rim and tire of the wheel so as to lock one end of the automobile against movement as the other end is being hoisted.

In order to provide a means for easily moving the device from one place to another, the sills 1 and 2 are provided at their ends with threaded openings 33 and in these openings are disposed screws 34 having wings 35 formed at their upper ends whereby the screws may be turned and carrying casters 36 at their lower ends. By this construction the casters may be raised so that the sills 1 and 2 will rest flat upon the floor, or they may be lowered so that the sills may be held out of contact with the floor.

In using the device the automobile to be repaired is either run between the posts 3 and 4 or else the hoist is itself moved on its casters and pushed in this relation with respect to the automobile. One wheel at one end of the automobile is then engaged by the clamp carried by the sill 2, and the rod 26 is then passed through the wheels at the other end of the automobile and bolted to the axle at that end. The cables 11 are then connected to the ends of the rod 26 and the crank 24 is turned so as to wind the cables upon the drums 10. With the automobile raised at one end the parts disposed beneath the same are easily accessible. After the required repairing has been done and it is desired to lower the automobile, the dog 25 is moved out of engagement with the ratchet 23 and this permits the winding drums to rotate in the proper direction to allow the cables 11 to be unwound.

From the foregoing description, taken in connection with the accompanying drawings, the construction, use and operation of the device will be readily understood.

Various changes in form, proportion, and in the minor details of construction may be resorted to without departing from the spirit of the invention as defined in the appended claims.

What is claimed is:

1. A hoist of the class described comprising a supporting frame, a pair of winding drums mounted upon said frame, driving means for said winding drums, flexible cables passing over said drums, and a rod adapted to be extended through the wheels of an automobile and connected to the axle thereof detachably connected to the ends of said cables.

2. A hoist of the class described comprising a frame, winding drums mounted upon said frame, driving means for said winding drums, a rod adapted to be extended through the wheels of an automobile and having an intermediate offset portion provided with means for attachment to the axle of the automobile, and cables passing over said drums and having their ends connected to the ends of said rod.

3. A hoist of the class described comprising a frame, a pair of winding drums mounted upon said frame, driving means for said winding drums, a rod adapted to be passed through the wheels of an automobile provided with an intermediate offset portion having means for attachment to the axle of the automobile, heads formed upon the ends of said rod, and cables wound upon said drums and having loops formed on their free ends, said loops being passed over said heads onto the ends of said rod to detachably connect said cables with the latter.

4. A hoist of the class described comprising a frame, winding drums mounted upon said frame, means for driving said drums, a rod adapted to be inserted through the wheels at one end of an automobile and connected to the same, cables passing over said drums and detachably connected at their free ends to the ends of said rod, and a clamp carried by said frame adapted to engage one of the wheels at the other end of the automobile.

5. A hoist of the class described comprising a frame including side sills, winding drums mounted upon said frame, means for driving said drums, a rod adapted to be inserted through the wheels at one end of an automobile and connected to the same, cables passing over said drums and detachably connected at their free ends to the ends of said rod, and a two part clamp pivoted at one end to one of said side sills and being offset to position it for engagement with one of the wheels at the other end of the automobile.

In testimony whereof I have hereunto set my hand.

MARTIN RASMUSSEN.